United States Patent [19]
Ross

[11] Patent Number: 5,675,748
[45] Date of Patent: Oct. 7, 1997

[54] METHOD AND APPARATUS FOR AUTOMATICALLY CONFIGURING COMPUTER SYSTEM HARDWARE AND SOFTWARE

[75] Inventor: Patrick Delaney Ross, Sunnyvale, Calif.

[73] Assignee: Object Technology Licensing Corp., Cupertino, Calif.

[21] Appl. No.: 608,326

[22] Filed: Mar. 8, 1996

Related U.S. Application Data

[63] Continuation of Ser. No. 171,542, Dec. 21, 1993, abandoned.

[51] Int. Cl.⁶ .................................................. G06F 15/16
[52] U.S. Cl. ............................................ 395/284; 395/651
[58] Field of Search ................................. 395/651–653, 395/284

[56] References Cited

U.S. PATENT DOCUMENTS

| | | | |
|---|---|---|---|
| 4,562,535 | 12/1985 | Vincent et al. | 395/325 |
| 4,589,063 | 5/1986 | Shah et al. | 395/275 |
| 4,622,633 | 11/1986 | Ceccon et al. | |
| 4,649,514 | 3/1987 | Berger | 395/325 |
| 4,660,141 | 4/1987 | Ceccon et al. | 395/275 |
| 4,821,220 | 4/1989 | Duisberg | 264/578 |
| 4,885,717 | 12/1989 | Beck et al. | 364/900 |
| 4,891,630 | 1/1990 | Friedman et al. | 340/706 |
| 4,953,080 | 8/1990 | Dysart et al. | 364/200 |
| 5,014,193 | 5/1991 | Garner et al. | 395/275 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,075,848 | 12/1991 | Lai et al. | 395/425 |
| 5,093,914 | 3/1992 | Coplien et al. | 395/700 |
| 5,119,475 | 6/1992 | Smith et al. | |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/575 |
| 5,161,102 | 11/1992 | Griffin et al. | 395/800 |
| 5,181,162 | 1/1993 | Smith et al. | 364/419 |
| 5,237,688 | 8/1993 | Calvert et al. | 395/700 |
| 5,249,270 | 9/1993 | Stewart et al. | 395/200 |
| 5,257,350 | 10/1993 | Howard et al. | 395/162 |
| 5,257,387 | 10/1993 | Richek et al. | 395/800 |
| 5,265,238 | 11/1993 | Canova, Jr. et al. | 395/500 |
| 5,287,531 | 2/1994 | Rogers, Jr. et al. | 395/800 |
| 5,297,262 | 3/1994 | Cox et al. | 395/325 |
| 5,327,553 | 7/1994 | Jewett et al. | 395/575 |
| 5,367,640 | 11/1994 | Hamilton et al. | 395/275 |
| 5,386,567 | 1/1995 | Lien et al. | 395/700 |

FOREIGN PATENT DOCUMENTS

| | | |
|---|---|---|
| 0398644 | 11/1990 | European Pat. Off. |
| 2203869 | 10/1988 | United Kingdom. |

OTHER PUBLICATIONS

IBM Technical Disclosure Bulletin, V.29(8), Jan. 1987, New York, US, pp. 3537–3540 "Dynamic Configuration".

*Primary Examiner*—Jack B. Harvey
*Assistant Examiner*—Paul R. Myers
*Attorney, Agent, or Firm*—Bookstein & Kudirka

[57] ABSTRACT

A hardware configuration system for enabling automatic configuration of hardware in a computer system. First, at system ipl, the particular computer system is identified based on its identification number. Then, a specific software component object is instantiated based on the computer system. All of the details of the standard computer system are predefined in the software component object based on supported hardware and peripherals for the specific hardware. Then a test is performed to determine if additional hierarchies are present. Each hierarchy has an associated identification number. If so, then for each hierarchy, the hierarchy is processed as discussed above. The result is a set of instantiated objects completely specifying the hardware environment.

16 Claims, 10 Drawing Sheets

METHOD AND APPARATUS FOR AUTOMATICALLY CONFIGURING COMPUTER SYSTEM HARDWARE AND SOFTWARE

This is a continuation of application Ser. No. 08/171,542 filed on Dec. 21, 1993, now abandoned.

BACKGROUND OF THE INVENTION

1. Field of the Invention

The present invention is generally directed to configuring hardware in a computer system, and more particularly to a system and method for automatically configuring hardware in a computer system.

2. Related Art

The phrase "hardware configuration" has many meanings. In the user domain of a computer system, hardware configuration refers to configuring computer components which are generally visible to users (this is called user-oriented hardware configuration). This includes tasks such as setting the double-click speed of a mouse, formatting a disk drive, connecting a modem to a serial port, or changing an existing connection.

In the input/output (I/O) domain of a computer system, hardware configuration refers to low-level services which control or regulate access to integrated circuits (ICs) and other low-level hardware resources (this is called I/O hardware configuration).

The present invention is primarily directed to automatic, low-level, hardware configuration, but can be applied to other types of hardware configuration, such as I/O hardware configuration.

Conventional computer systems distribute hardware configuration tasks among many different applications. For example, on the well-known Apple Macintosh computer, the Chooser application must be used to connect a StyleWriter printer to a modem port. To connect a modem to the modem port, a communication application (e.g. MacTerminal) must be used. To set up an Apple SCSI drive, the "Apple HD SC Setup" application must be used. To set the double-click speed of the mouse, the mouse control panel in the control panels folder must be used. As will be appreciated, it is difficult for users to keep track of where these configuration applications are maintained. Also, it is difficult for users to remember which configuration applications are required for the configuration of particular resources.

Users must inform the computer of the location of some devices (that is, tell the computer how and where the devices are connected to the computer). These devices are called manually connected devices or manually configured devices, and require special attention with regard to hardware configuration.

When a manually connected device is attached to a computer, the computer cannot sense its presence. As an aspect of hardware configuration, some entity in the computer must be told (by a user) what kind of device it is and where it is connected.

On the well-known Apple Macintosh System 7, the entity that is told depends on the type of the device in question. For example, the "Comm Toolbox" is used for modems and the Chooser is used for printers. Furthermore, the Comm Toolbox is port centric, not device centric (that is, the information saved by a document is about a port, not a device). If a user moves his modem to a different port, all of the terminal documents using that modem will not properly transmit when asked to do so, because they will expect the modem to be connected to the original port.

Thus, what is required is a system and method for hardware configuration that does not suffer from the problems discussed above.

SUMMARY OF THE INVENTION

The present invention is directed to a hardware configuration system for enabling automatic configuration of hardware in a computer system. First, at system Initial Program Load (IPL), the particular computer system is identified based on its identification number. Then, a specific software component object is instantiated based on the computer system. All of the details of the standard computer system are predefined in the software component object based on supported hardware and peripherals for the specific hardware. Then a test is performed to determine if additional hierarchies are present. Each hierarchy has an associated identification number. If so, then for each hierarchy, the hierarchy is processed as discussed above. The result is a set of instantiated objects completely specifying the hardware environment.

DETAILED DISCUSSION OF THE PREFERRED EMBODIMENTS

The present invention is directed to an object-oriented system and method for configuring the hardware of a computer system. Since it is object-based, the present invention will be described herein using object-oriented terms and concepts. Such object-oriented terms and concepts are well known, and are discussed in many publicly available documents, such as *Object-Oriented Design* by Grady Booch (Benjamin Cummings 1991).

Figure 1:
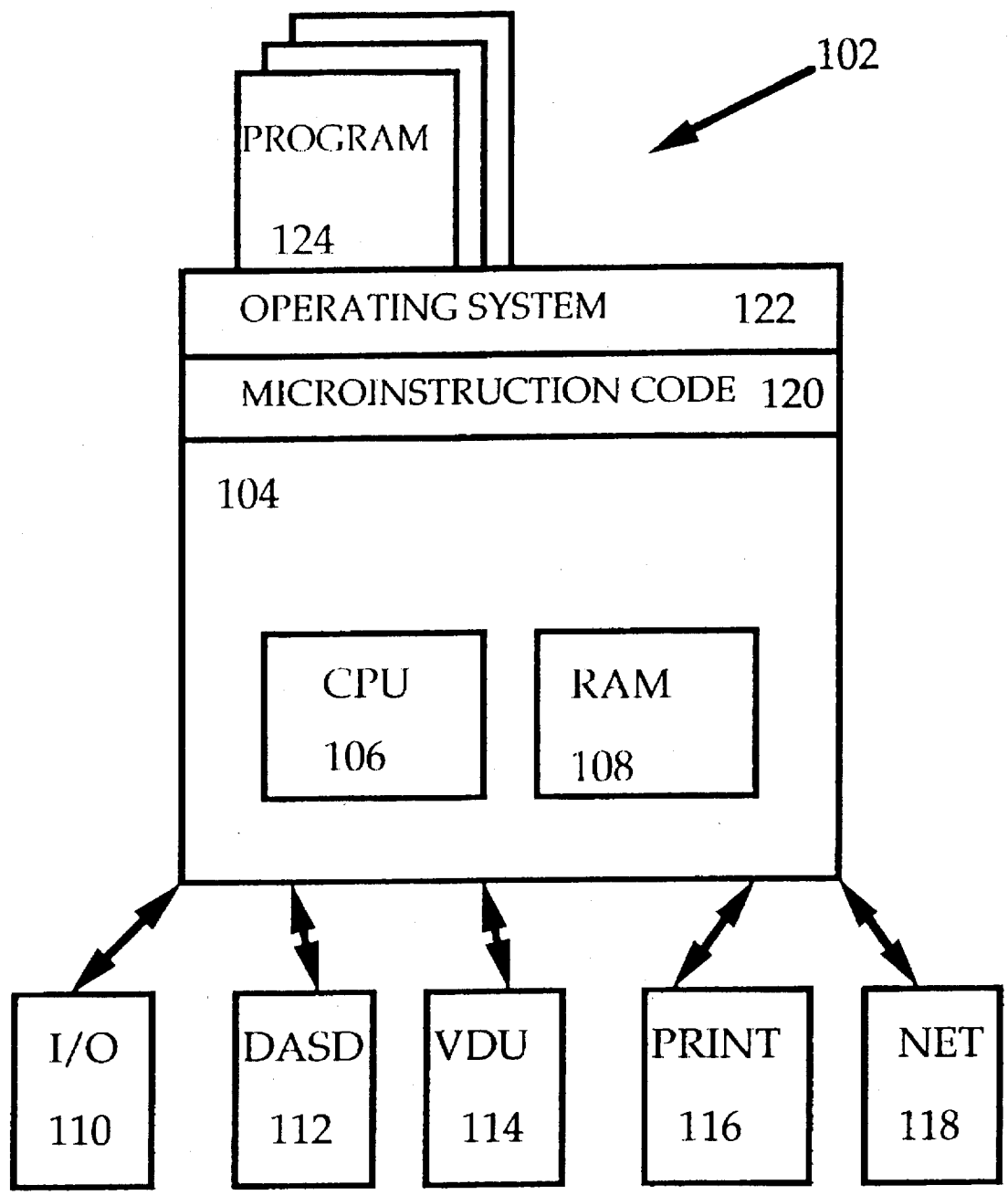
FIG. 1 is a block diagram of a computer system in which the hardware configuration system in accordance with a preferred embodiment operates.

FIG. 1 illustrates a high-level block diagram of a computer system 102 in which the object-oriented configuration system in accordance with a preferred embodiment operates. It should be noted that the present invention alternatively encompasses the configuration system in combination with the computer system 102.

The computer system 102 includes hardware components 104, such as a random access memory (RAM) 108 and a central processing unit (CPU) 106. It should be noted that the CPU 106 may represent a single processor or multiple processors operating in parallel.

The computer system 102 also includes peripheral devices which are connected to the hardware components 104. These peripheral devices include an input device or devices (such as a keyboard, a mouse, a light pen, etc.) 110, a data storage device 112 (such as a hard disk or floppy disk), a display 114, a printer 116, and a network adapter 118. The computer system 102 could be connected to other peripheral devices.

The computer system 102 also includes an operating system 122, and may include microinstruction code 120 (also called firmware). The operating system 122 may represent a substantially full-function operating system, such as the Disk Operating System (DOS) and the UNIX operating system. The operating system 122 may alternatively represent other types of operating systems. Preferably, the operating system 122 represents a limited functionality operating system, such as the Mach micro-kernel developed by Carnegie Mellon University (CMU), which is well-known to those skilled in the relevant art.

In a preferred embodiment in accordance with a preferred embodiment, the computer system 102 is an International Business Machines (IBM) computer or an IBM-compatible computer. In an alternate embodiment in accordance with a preferred embodiment, the computer system 102 is an Apple computer.

One or more programs 124 operate in parallel in the computer system 102.

Preferably, the object-oriented configuration system in accordance with a preferred embodiment is implemented as a collection of object-oriented objects which execute in the computer system 102. These objects are represented by one or more of the programs 124 which execute in the computer system 102. Alternatively, the objects could be implemented as part of the operating system 122 where the operating system 122 is object-oriented, rather than procedural based. Other methods of representing the configuration system in accordance with a preferred embodiment (as discussed herein) in the computer system 102 will be apparent to persons skilled in the relevant art.

The objects which implement the configuration system in accordance with a preferred embodiment are instances of a plurality of object-oriented classes which are collected to form an object-oriented hardware configuration framework. This hardware configuration framework and the classes contained therein are discussed below.

Before discussing the present invention in detail, it will be useful to define a few terms which are important for the understanding in accordance with a preferred embodiment.

The first term is "auto configuration." There are two types of auto configuration. The first type is really more auto identifying than it is auto configuring. Devices falling into this category can identify themselves to the system. The system then turns around and looks for the required software, which in some cases must be manually "installed" by the user (see manual configuration below). The other form of auto configuration is self contained configuration. Devices falling into this category not only identify themselves, but can also provide their own configuration software and data. Auto configuration is "Bottom Up". The system configures itself and it transfers information up to the top (the user).

The second term is "manual configuration." Manual configuration requires the user to do something special (e.g. "install" a service or tell the computer where a device is connected). There are three cases of manual configuration.

According to the first case, the device is identifiable by the system, but the required device service(s) can not be found. The user must manually "install" the service(s). This device is "software impaired".

According to the second case, the required services are available, but the device is not detectable or identifiable by the system (i.e. its icon appears in the parts bin, but the device itself does not appear in the computer viewer). In this case, the user must drag the device from the parts bin to where the device is connected in the computer viewer.

In the third case, the required services are not available nor is the device detectable. This is a partial combination of the two cases above. First, the user must "install" the service(s). Then he can drag the device from the parts bin to where the device is connected in the computer viewer. Manual configuration is "Top Down". The user supplies configuration information via some User Interface and this information percolates down to the bottom (the I/O system).

The next term is "software impaired hardware." A hardware resource is deemed to be software impaired whenever the hardware resource is known to the system, but the system is unable to use it because the required software can not be found. A THardwareModule can represent impaired hardware. A THardwareModule may not become partially impaired. All software necessary to initialize a card must be available at the time the card THardwareModule is registered. Software impaired hardware is discovered on refresh or at boot time.

The hardware configuration system in accordance with a preferred embodiment supports a hardware configuration viewer, which is preferably implemented using object-oriented techniques (such as being instances of related classes that form a framework). The hardware configuration viewer is described below.

The hardware configuration viewer is a tool for displaying to a user a graphical representation of a computer's current hardware configuration. The hardware configuration viewer operates by using the parts bin (discussed below). There are many types of hardware configuration viewers.

For example, a computer viewer displays a graphical representation of the current configuration of an entire computer system.

A printer viewer allows a user to see the configuration of a printer. For example, the printer viewer displays the hard disk drive(s) as well as optional attachments to the printer like a sheet feeder. The user could see what fonts the printer has (on the disk drive).

A parts bin viewer presents to a user all the "potentially" connectable "dumb" devices (like the Apple Chooser, only the Chooser shows some of the currently connected devices as well). The presentation by the parts bin viewer may include a window which has a tab for each device type. For example, tabs could be provided for printers and modems. The user selects a particular tab to see all the devices of a particular type. Thus, the Computer Viewer shows the user what is connected, whereas the parts bin viewer shows the user what can be connected.

A device configuration viewer enables a user to configure a "real device" (that is, a physical device). Device configuration viewers are created by presentation objects. An entity of the operating system may create a presentation object using information obtained from a device object. For example, a configuration viewer for a disk drive will be created to reformat, partition, test, mount and unmount volumes for a drive.

Architecture of the Hardware Configuration System

Figure 2:
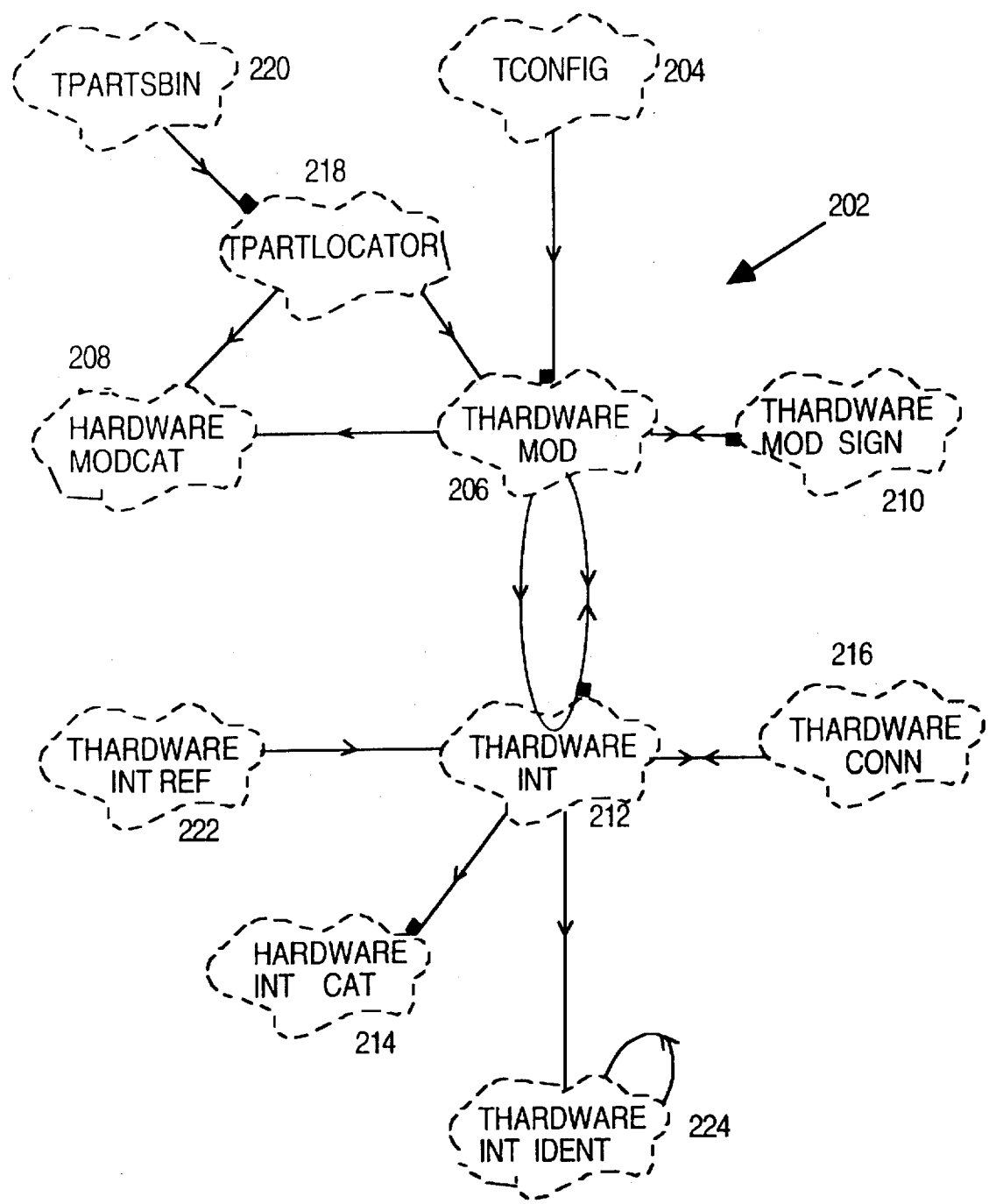
FIG. 2 is a class diagram of a hardware configuration framework according to a preferred embodiment in accordance with a preferred embodiment.

As discussed above, the object-oriented configuration system in accordance with a preferred embodiment is implemented as a collection of object-oriented objects which execute in the computer system 102. These objects are instances of a plurality of related object-oriented classes which are collected to form an object-oriented hardware configuration framework. FIG. 2 is a class diagram of this hardware configuration framework according to a preferred embodiment in accordance with a preferred embodiment. The classes which form the hardware configuration framework are discussed in the following sections.

THardwareConfiguration

The primary purpose of the THardwareConfiguration class 204 is to support centralized user configuration of hardware. It does this by providing a set of hardware related database services. THardwareConfiguration 204 owns a collection of THardwareModule objects. Clients may add new or remove existing THardwareModule objects from an instance of THardwareConfiguration. Clients may directly retrieve from an instance of THardwareConfiguration, every THardwareModule object or specific kind(s) of THardwareModule objects (e.g. kind=printer, kinds=scanner & modem).

Figure 3:
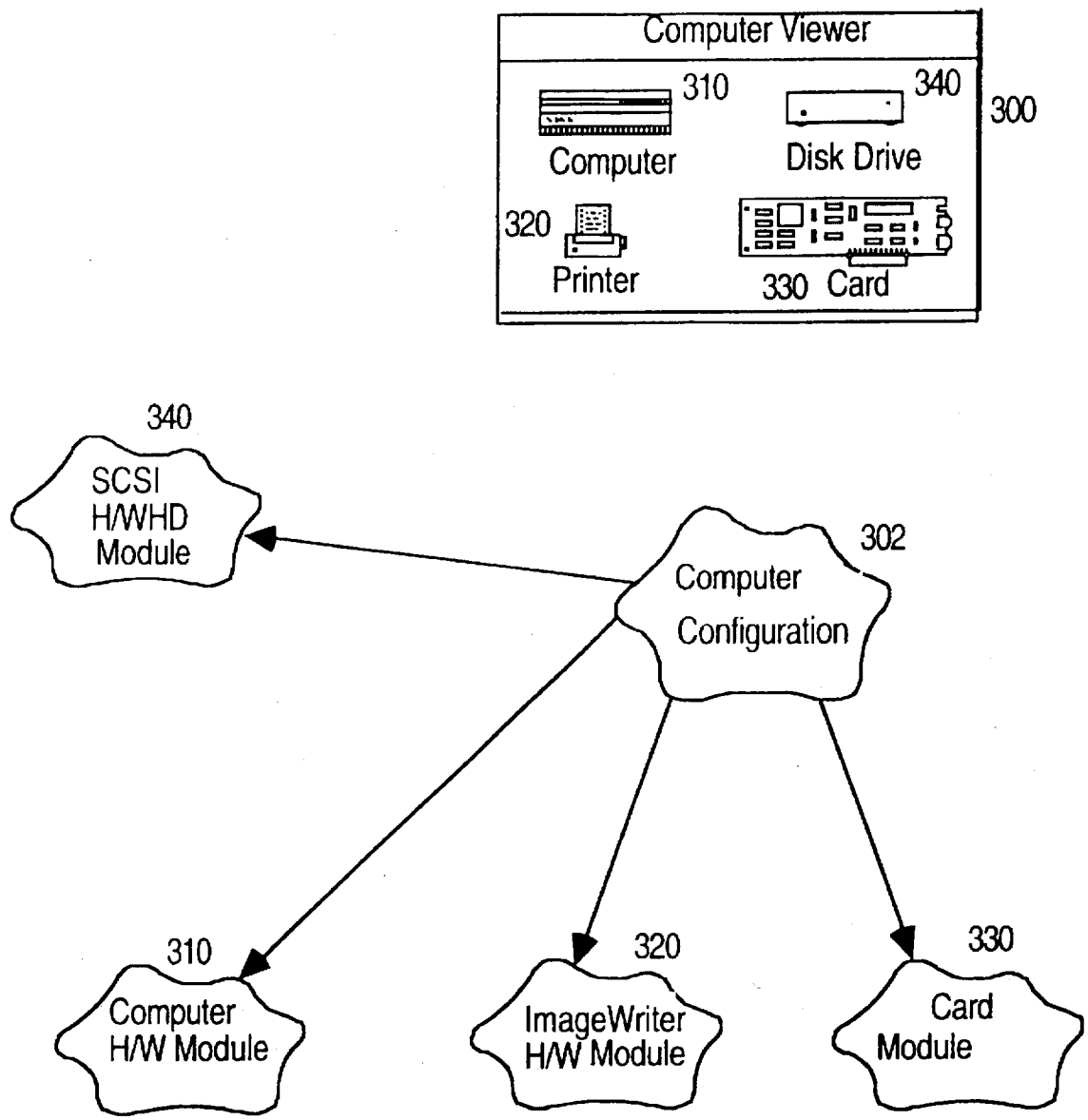
FIG. 3 is a diagram used to illustrate the operation of a THardwareConfiguration object in accordance with a preferred embodiment.

Clients have access to a special THardwareConfiguration object, known as the ComputerHardwareConfiguration (also called the computer hardware database), which represents a personal computer's local hardware configuration. It includes devices such as the computer, mouse, keyboard and monitor. This database is the foundation of centralized user configuration of a personal computer. FIG. 3 depicts an example ComputerHardwareConfiguration.

With THardwareConfiguration objects, notification is sent to interested clients when any change is made to a hardware configuration (e.g. a hardware module is added or removed or a connection changed). Clients are only alerted that a change occurred and are not given any additional details about the change. Since changes to hardware configurations occur very infrequently, this minimal notification scheme is not expected to be a problem (e.g. noticeably increase interprocess communication, IPC, traffic).

HardwareModule

The purpose of a THardwareModule object 206 is to represent, at a very low level, a device which will be displayed by the hardware configuration viewer (or parts bin) and which will be configured or used by a user. THardwareModule objects 206 are used to represent computers, cards and peripherals. For example, each of the following would be represented by its own THardwareModule object: Apple Macintosh IIci computer, Apple ADB keyboard, and Macintosh Video Card.

As a member of THardwareConfiguration, a THardwareModule object 206 represents a real device which a user may attempt to configure or use. As a member of a TPartLocator (i.e. parts bin 220, described below), a THardwareModule object 206 represents a prototype for any number of real devices with identical characteristics (i.e. a part which can be added to the system).

A THardwareModule object 206 owns a set of ordered THardwareInterface objects 212 (discussed below; THardwareInterface objects 212 are also called connector objects, or simply connectors, herein). Each THardwareInterface object 212 corresponds to a real physical connector on a real device. For example, with reference to FIG. 4, the THardwareModule object 410 which represents the multi-function card 402 will own the THardwareInterface objects 416, 414, and 412, respectively corresponding to the following devices: one edge connector 404, a video connector 406 and a SCSI connector 408.

Since THardwareModule is not required to be subclassed, the creator of a THardwareModule object must ensure that the appropriate THardwareInterface objects are created and adopted into the THardwareModule object.

Each THardwareInterface object 206 corresponds to a THardwareInterfaceIdentifier object 224 (described below) and additionally corresponds to a connector object in a presentation object displayed by the computer viewer.

Figure 4:
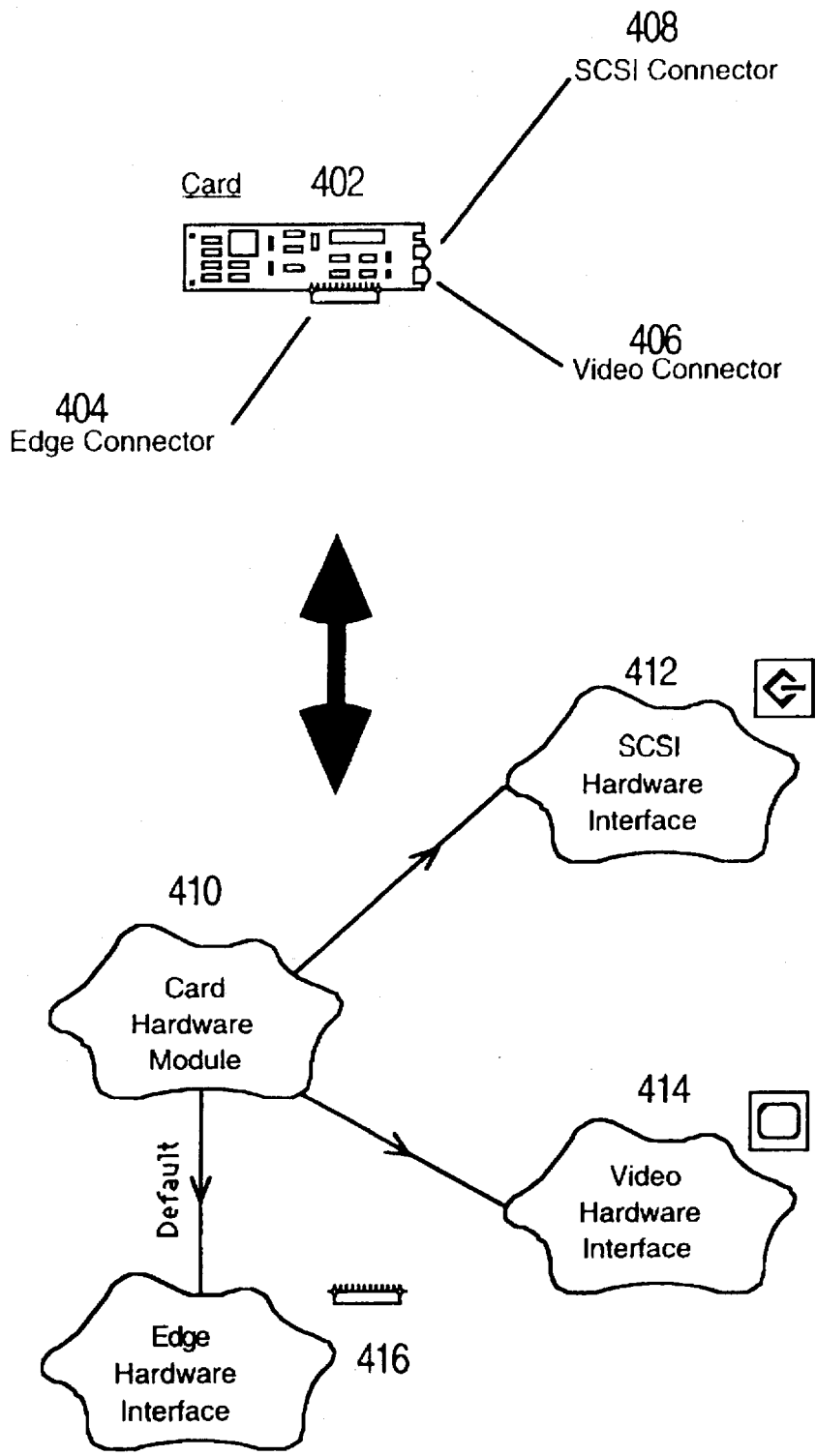
FIG. 4 is a diagram used to illustrate the operation of a THardwareModule object in accordance with a preferred embodiment.

One or more of the owned connectors is considered the default (see FIG. 4, where the edge hardware object 416 is the default). Default connectors represent special connectors which are chosen as potential connection targets during drag and drop of devices onto connectors. This is a short cut for generating connections. The alternative is to drop the icon into a hardware viewer and then manually wire it to the proper connector. Example short cut method: A user drags the video-SCSI card, illustrated above, out of the parts bin and onto an ISA slot connector in the computer viewer. The computer viewer chooses the edge connector (over the SCSI or video connector) because the developer has specified the edge connector as the default.

Sometimes more than one default connector is required. For example, a printer could have both a serial port and a parallel port. If the user dragged this printer over to the serial port, the computer viewer would test both default connectors for compatibility. It would discover that the printer was compatible with the serial port. The user could continue to drag the printer over to a parallel port. The computer viewer would discover that the printer was also compatible with that.

Each THardwareModule object 206 has a personality-independent HardwareModuleSignature object 210 (discussed below) which identifies the class of physical hardware to which the THardwareModule object belongs to. For example, a THardwareModule object 206 which represents an Apple ImageWriter II will have an instance of THardwareModuleSignature 210 whose value is "AppleImageWriterII".

Each THardwareModule object 206 has one or more HardwareModuleCategory objects 208 (discussed below). Each category object 208 represents one particular kind of device that the THardwareModule object 206 is capable of representing. For example, a THardwareModule object 206 which represents a fax machine capable of being used as a modem, scanner, printer and fax, will have one instance of each of the following HardwareModuleCategorys 208: "modem", "scanner", "printer" and "fax".

Typically, every THardwareModule object 206 in a hardware database is "connected" to at least one other THardwareModule object 206. However, this is not a requirement since a device may become completely disconnected for a variety of reasons. Disconnected devices in a THardwareConfiguration are still owned by the THardwareConfiguration object and are reachable by direct iteration.

A THardwareModule object has a number of attributes, including "root," "internal," and "wants persistence." Root is a Boolean value. If true, then the THardwareModule object 206 is the central device of a THardwareConfiguration. Each THardwareConfiguration object 204 has one root device. For a personal computer database, the THardwareModule object 206 which represents the computer is the root device. Root defaults to FALSE. The root device is a special device used by the Hardware Configuration Viewer. When the Abstract or Schematic view by the hardware configuration viewer is displayed, the root device is "exploded" into a special area.

Internal is also a Boolean value. If true, then the real device is physically located inside of the root device. For example, the internal hard drive of a Macintosh is "inside" the computer. Defaults to FALSE. This state is used only by the computer viewer's schematic view. If a device is inside of the computer, it is displayed in a special area.

"Wants persistence" is a Boolean value. A module that is not persistent is implicitly removed from the configuration when the system reboots (its connections are implicitly removed as well). On the other hand, a persistent module stays in the configuration through reboots, until it is explicitly removed. Typically, all manually connected devices will want to be automatically restored by the HW configuration framework and SCSI disk drives will not. Defaults to FALSE.

HardwareModuleCategory

The purpose of HardwareModuleCategory 208 is to permit clients to group THardwareModule objects 206 by kind. An instance of HardwareModuleCategory 208 may be owned by a THardwareModule object 206 or by a TPartLocator object 218 (discussed below). When owned by a THardwareModule object 206, an instance of HardwareModuleCategory 208 represents a kind of device the module is capable of representing. Each THardwareModule object 206 will have one HardwareModuleCategory object 208 for each kind of device it can represent.

When owned by a TPartLocator object 218, an instance of HardwareModuleCategory 208 represents the common group of all THardwareModule objects 206 owned by the TPartLocator object 218.

Supported device categories include: Monitor, Printer, Keyboard, Pointing (mouse or tablet), Modem, Card, Disk drive, Scanner, FAX, etc.

HardwareModuleSignature

The purpose of HardwareModuleSignature 210 is to provide a mechanism which enables operating system (OS) personalities (e.g. OS/2) to create objects of their own to represent THardwareModule objects 206. This is required because THardwareModule objects 206 have no knowledge of what OS personalities reside above them. An instance of HardwareModuleSignature 210 represents a personality independent "key" to a unique personality dependent entity. For example, a particular operating system could use this key to resurrect a presentation object, corresponding to the HardwareModule object 206, from a file. Or, it could translate the signature into a presentation class name and then create a new presentation object corresponding to the THardwareModule object 206.

An instance of THardwareConfiguration 204 can include many devices with equivalent HardwareModuleSignature objects 210. For example, a database could have two 80 MB Apple disk drives. Equivalent instances of HardwareModuleSignature 210 will exist, one for each THardwareModule object 206. These are not the same devices. They are two different THardwareModule objects 206 representing two different real devices of the same type.

THardwareInterface

The purpose of THardwareInterface 212 is to represent, at a very low level, a real connector on a real device. It can represent a connector on the computer, a card or a peripheral. For example, each of the following would be represented by its own THardwareInterface object 212: SCSI connector on a Macintosh IIfx, video connector on a Macintosh video card or a serial connector on a StyleWriter. THardwareInterface objects 212 are owned by THardwareModule objects 206.

Each THardwareInterface object 212 has one or more HardwareInterfaceCategory objects 214 (described below). Each category object 214 represents one particular kind of interface that the THardwareInterface object 212 is capable of representing. For example, a THardwareInterface object 212 which represents a serial port, will have one instance of each of the following THardwareInterfaceCategory objects 214: "serial".

Figure 5:
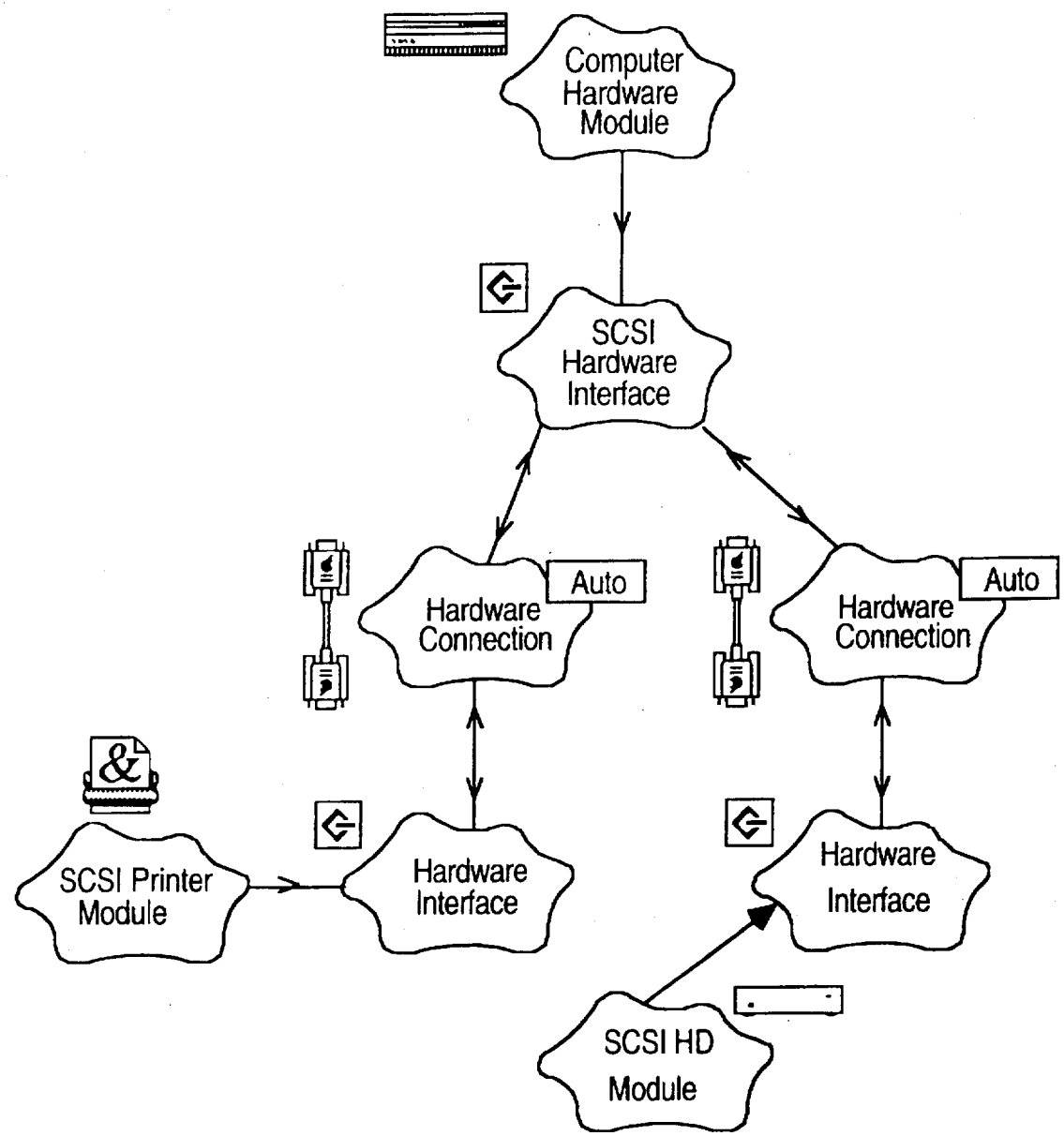
FIG. 5 is a diagram used to illustrate the operation of a THardwareInterface object in accordance with a preferred embodiment.

Each instance of THardwareInterface 212 will have one THardwareConnection object 216 (discussed below) for each THardwareInterface object 212 to which it is connected. For example, as shown in FIG. 5, a SCSI connector on the computer can be connected to a SCSI disk drive and a SCSI printer. The SCSI connector on the computer would have two THardwareConnection objects 216. The SCSI disk drive and the SCSI printer would each have one.

Each instance of THardwareInterface 212 will have one THardwareInterfaceIdentifier object 224 (discussed below) which serves as a unique key into the database.

Some THardwareInterfaces 212 will represent an actual "interface port" (e.g. the SCSI port on a computer or the video port on a video card). These THardwareInterfaces 212 can be used to start service stacks.

Clients can request THardwareInterface objects 212 to refresh. To accomplish this, a client (e.g. the computer viewer) creates a THardwareInterfaceReference 222 with "MReconfigurableInterface" as the top interface. If "MReconfigurableInterface" is supported, a service will be returned when the hardware reference object 222 is activated and the client may safely call Reconfigure() on it.

A side effect of allowing a THardwareModule object 206 to have more than one THardwareInterface object 212 is that a connection may indirectly "loop" back to a device. If a client were attempting to traverse all of the connections of a device, he would need to be aware of potential loops.

A THardwareInterface object 212 has the following attributes:

Max connections: This is a short integer. A THardwareInterface object 212 may support one or more connections. This attribute specifies the maximum number of legal connections a THardwareInterface object 212 may have. Defaults to 1.

Mode: Possible values are In/Out/InOut. This specifies the transmission mode. A THardwareInterface object 212 can be an input, an output or both. Defaults to InOut.

Reconfigurable: This is a boolean value. If true, then the hardware can support refresh (i.e. it can probe to see if anything has changed). It does not mean that a service is available to actually perform the rescan. Defaults to FALSE.

This attribute is only used as an optimization. Before a client attempts to refresh a port, if can first check to see if the hardware can support it. This same information can be determined by activating the THardwareInterfaceReference 222 for the port. However, most hardware will not support reconfiguration and using property searches is slow.

Wants persistent Connections: This is a boolean value. The concept of persistence is the same as described for THardwareModule 206. A connector can request that its connection(s) be persistent. A connection will persist if either connector forming the connection makes this request. Defaults to FALSE.

A connector which wants persistent connections implies that its device also wants persistence. If they do not agree, then an exception is generated.

HardwareInterfaceCategory

The purpose of HardwareInterfaceCategory 214 is to permit clients to group THardwareInterface 212 objects by kind. For example, a client may want to find and group all of the serial ports for a given hardware configuration. An instance of HardwareInterfaceCategory 214 represents a kind of interface a connector is capable of representing. Each THardwareInterface object 212 will have one HardwareInterfaceCategory object 214 for each kind of interface it can represent. The interface categories include: Serial, Parallel, Video, MIDI ADB, SCSI and Slot.

THardwareConnection

The purpose of a THardwareConnection object 216 is to support distinct presentations for connections based on their state. An instance of THardwareConnection 216 represents a connection between two THardwareInterface objects 212.

A hardware connection object 216 has the following attributes:

Kind: A connection may be automatic or manual. An automatic connection is made by the system. A manual connection is made by the user. It is important to be able to distinguish between these two types of connections. A user should not modify automatic connections. Hence, these connections are presented in such a way as to prevent users from changing them. Defaults to Automatic.

Wants Persistence: A boolean value. A derived attribute which is true if either connector wants persistent connections.

A connection object 216 can be created if (1) the maximum number of connections is not exceeded on either one of the THardwareInterface objects 212; (2) the "stack" of services between the two THardwareInterface objects 212 is createable (or created). This means that the appropriate services must be installed before a user is allowed to connect a new device in Ms computer viewer; and (3) the modes of the two THardwareInterface objects 212 are valid (using the table below):

TABLE 1

|  | In | Out | In/Out |
|---|---|---|---|
| In | X | Valid | X |
| Out | Valid | X | X |
| In/Out | X | X | Valid |

TPartLocator

The purpose of TPartLocator 218 is to find all of the "installed" THardwareModule "prototypes" for a specific PartsBin category. As a member of a TPartsBin object 220, an instance of TPartLocator 218 represents the set of devices to be displayed by a PartsBin viewer, for a particular tab. Each TPartLocator object 218 has a BinCategory. The BinCategory specifies what kinds of devices the TPartLocator object 218 will find. For example, if the BinCategory ="Printer", then the TPartLocator object 218 will find all prototypes of printer "installed" on the system. When used by the parts bin, this bin category corresponds to a tab on the parts bin viewer. The parts bin viewer will own one TPartLocator for every tab it displays.

A TPartLocator object 218 refers to a set of Parts (i.e. THardwareModules 206). Each part represents a device which the computer system is capable of supporting. For example, a printer TPartLocator object will own one prototype THardwareModule object for each type of printer found.

A TPartLocator object 218 has the following additional behaviors:

All of the THardwareModule objects 206 owned by an instance of TPartLocator 218 belong to the same HardwareModuleCategory 208.

All of the THardwareModule objects 206 owned by an instance of TPartLocator 218 have unique HardwareModuleSignature objects 210.

TPartsBin

The purpose of TPartsBin 220 is to organize the plethora of manually configurable devices into meaningful sets of related devices. For example, instead of presenting the user with the complete list of every device which his system is capable of supporting, the Parts bin 220 organizes this set of devices into several lists, each list based on a device category. A TPartsBin object 220 owns a set of Bin TPartLocator objects 218. Each bin represents a compartment and corresponds to exactly one tab on the parts bin viewer. The PartsBin viewer displays the contents of TPartLocator objects 218. As new "parts" are introduced into the system (i.e. installed), the appropriate TPartLocator objects 218 are updated. Furthermore, as new categories of "parts" are introduced, new TPartLocator objects 218 are created by the TPartsBin object 220 and new tabs are automatically displayed. User customizable locators are not excluded.

The parts bin presents to the user all of the "potentially" connectable "dumb" devices (like the Apple Chooser, except the Chooser shows a few of the currently connected devices as well). The presentation consists of a window which has a tab for each device type. For example, tabs will be provided for printers and modems. The user selects a particular tab to see all the devices of a particular type. The user may drag a device out of the parts bin and to the computer viewer to connect it.

The parts bin replaces that part of the Apple Chooser or similar entity where a user would select a printer and then click on the port the printer is connected to. It also replaces that part of MacTerminal or similar application where the user would select the port the modem is connected to.

Every file which represents a prototype of a THardwareModule 206, and expects to be shown in the parts bin, must include one PartsBin THardwareCategory property for every compartment the icon expects to appear in.

A TPartsBin object 220 has the following additional behaviors:

The user may open any of the icons to specify persistent default settings.

An icon may belong to more than one parts bin category and hence may appear in more than one compartment of a parts bin.

THardwareInterfaceReference

The purpose of THardwareInterfaceReference 222 is to shield clients from the details of how a service for a local device is created. It encapsulates the details necessary to create the service (for example, what port the device is connected to). It uses this information along with other information to build the appropriate service stack. The interface reamed, as a result of creating the stack, is a strongly-typed interface to the desired service. This "top" interface is specified directly by the client.

An instance of an active THardwareInterfaceReference object represents access to a service provided by a real local device.

THardwareInterfaceIdentifier

The purpose of THardwareInterfaceIdentifier 224 is to uniquely identify a real physical hardware component. THardwareInterfaceIdentifier objects 224 are used by services and configuration access managers (CAMs) to get the physical information they require to actually drive the hardware (for example, a service may require the physical address of the chip, IRQ, byte-lane information, etc.). THardwareInterfaceIdentifier objects 224 are strongly typed so the service will know exactly what information is available and how to get it.

Figure 6:
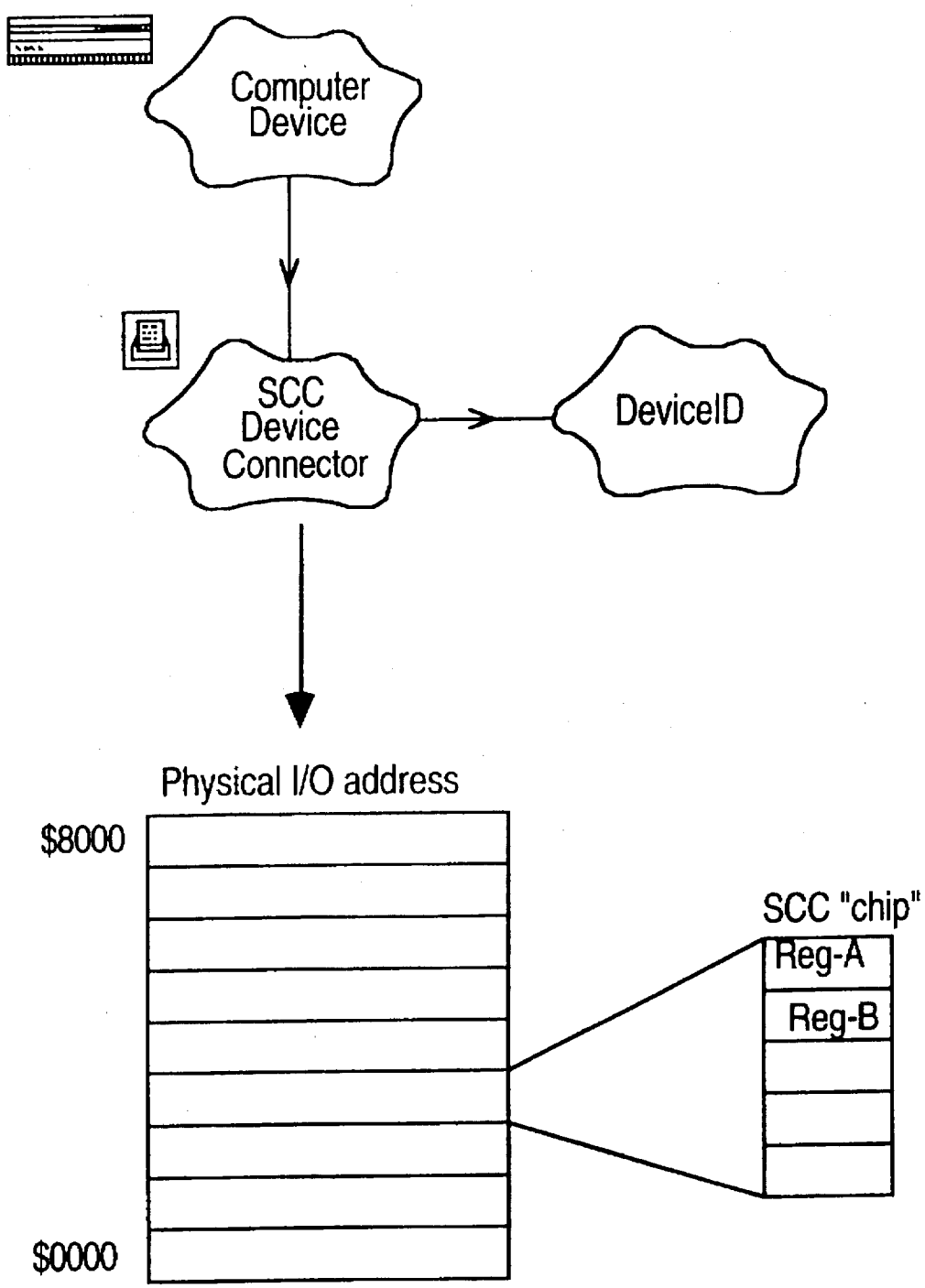
FIG. 6 is a diagram used to illustrate the operation of a THardwareInterfaceIdentifier object in accordance with a preferred embodiment.

As an example, the THardwareInterfaceIdentifier object, shown in FIG. 6, is for a serial THardwareInterface object which is owned by a computer THardwareModule object. The THardwareInterfaceIdentifier object could be used by a service to get the physical I/O address of the SCC chip it represents.

A Configuration Access Manager is an input/output system entity responsible for the initialization of system hardware resources. It is subclassed for each type of hardware resource. For auto-config devices, subclasses are responsible for finding live devices and starting their associated CAM's. A CAM may or may not automatically create and initiate an Access Manager (AM) for a device. For example, a SCSI CAM may create and initiate an AM for a SCSI HD but not for a SCSI printer. AM's for printers are really not required until the printer is used.

An Access Manager is an IO service which can talk directly to a chip. The AM handles arbitration between multiple requests to access the chip.

Operation in Accordance with a Preferred Embodiment

The operation in accordance with a preferred embodiment shall now be described by discussing the manner in which the present invention operates in a typical hardware configuration scenario. The operation in accordance with a preferred embodiment under different hardware configuration scenarios will be apparent to persons skilled in the relevant art based on the discussion contained herein.

This scenario relates to the manual connection of a device. In this scenario, a user adds a new ISA serial card to his system and successfully boots. During the boot process, the ISA probe fails to find the card, so the card can not be used. Furthermore, the card is not displayed in the computer viewer. Its absence in the computer viewer is a hint to the user that the system does not see it. The user must teach his system about this new hardware module. He does this by using the computer viewer as supported by the hardware configuration system as shown in the following steps.

Figure 7A:
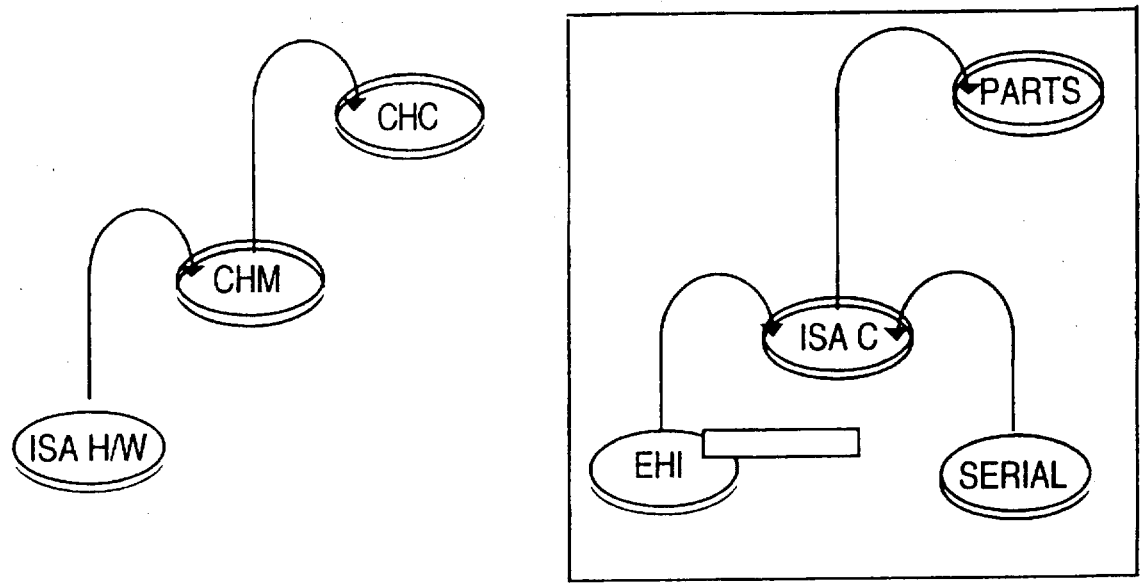
FIGS. 7A–7E are diagrams used to illustrate the manner in which a preferred embodiment operates during an example hardware configuration scenario.

(1) First, the user opens the computer viewer and the parts bin. FIG. 7A is a partial illustration of the initial state of the computer hardware configuration and the parts bin. The computer hardware configuration is shown with one computer module which has an empty ISA slot. The parts bin has the ISA card we want to update the system with.

(2) The user drags the ISA card icon from the parts bin over to any empty ISA slot icon on the computer (preferably the same slot it is really plugged into). The default connector is obtained from the card THardwareModule object (in this example it is the edge connector). Type negotiation between the two icons certifies that it is permissible for these two to be joined together. The standard negotiation process takes into account the invariants for connections as specified herein.

Figure 7B:
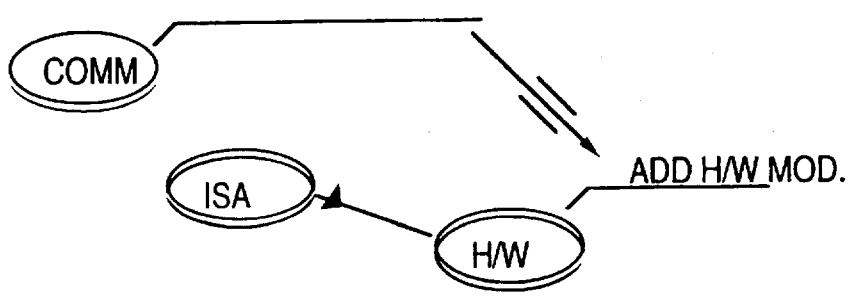

(3) Now this card is connected to the slot. This is performed as follows. First, the computer viewer (via a command object) adds the card THardwareModule object to the ComputerHardwareConfiguration. This is depicted in FIG. 7B.

Figure 7C:
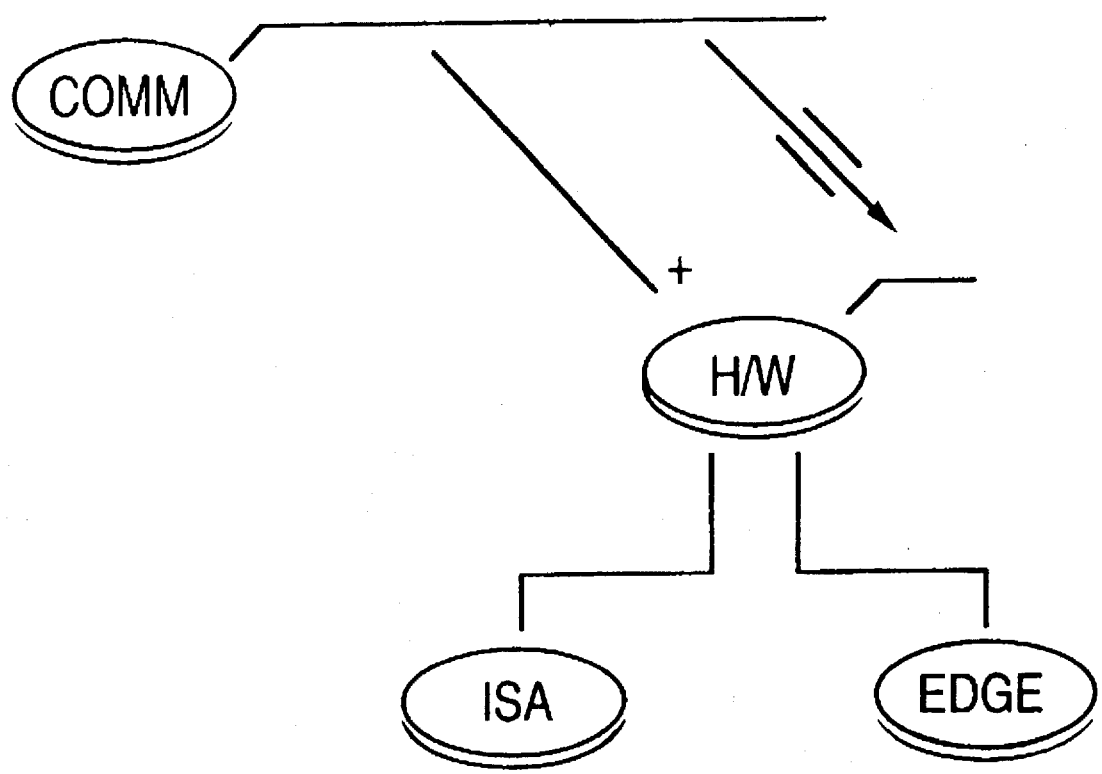

(4) Next, the connection must be connected. This is depicted in FIG. 7C. There are two connector (i.e. THardwareInterface) objects: one from the computer viewer, chosen by the user, and one from the card, chosen by default. The command connects the two connectors together by creating a THardwareConnection. The final step is to call the Add method, on the connection, to consummate the connection.

Figure 7D:
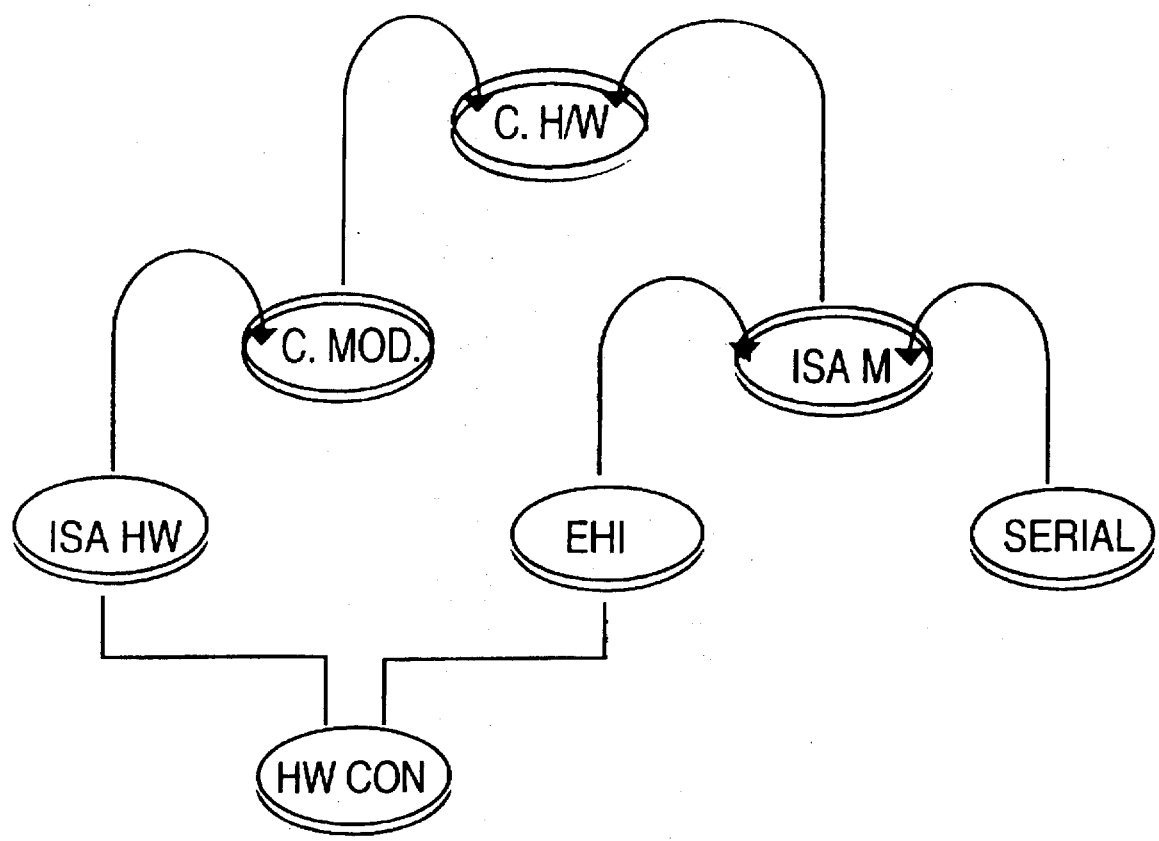

(5) The ComputerHardwareConfiguration now has a copy of the ISA card and is connected to the ISA slot. This is depicted in FIG. 7D.

Figure 7E:
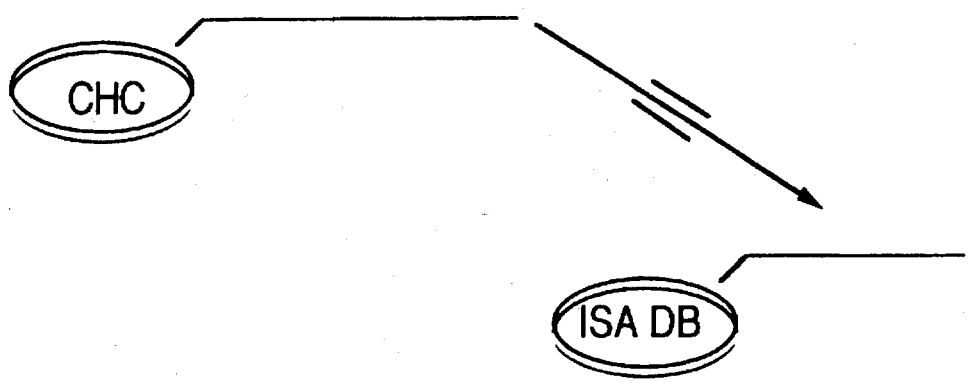

(6) Any change to the hardware configuration results in a notification event, which is sent to all interested clients. For example, the ISA configuration database is interested in manually connected ISA cards and receives notification. This is depicted in FIG. 7E. In many cases, the new ISA card can be used as soon as the ISA database learns about it. However, if the ISA card CAM requires additional information (e.g. physical address, IRQ and/or DMA information), it may still be unavailable for use. The user may be required to supply this information to the card CAM. If so, then the ISA card icon should reflect the state (via a "software impaired" device icon or similar). Furthermore, a user alert may be generated to notify the user of this problem.

Persistence of Handles

This section describes the behaviors of handles as they relate to the master objects in a hardware configuration. The hardware configuration framework in accordance with a preferred embodiment provides all clients with persistent handles for the following: THardwareConfiguration 204, THardwareModule 206, THardwareInterface 212 and THardwareConnection 216.

Authentic and Dangling Handles

Handles can be in one of two states, Authentic or Dangling. An authentic handle is a handle which refers to a master in the database. One gets an authentic handle by adding a master to the database, or by copying another authentic handle. A dangling handle is a handle which no longer refers to a master in the database. Dangling handles can be copied, but clients may not use dangling handles to actually read or write the master.

Handle Transition

A handle transitions from the authentic to dangling state if either of the following events occur. (1) Unbeknownst to one handle, the master is explicitly removed from the database by another handle. Or (2) the master is implicitly removed from the database as a result of reboot (because the master has been marked as non-persistent). A handle transitions from the dangling to authentic state when a new master is added to the database that is "equivalent" to the (old) master that was referred to by the handle when it was in the authentic state. Equivalence is defined below.

Handle Equivalency

The single THardwareConfiguration master per hardware configuration is implicitly marked persistent. THardwareConfiguration masters only go away when the database is destroyed. Handles referencing destroyed databases will dangle forever. Two configuration masters are never considered "equivalent", for the purposes of this section. A pair of THardwareModule masters are considered "equivalent" if (1) they have identical values for the Type attribute (THardwareModuleSignature), and (2) there is a one-to-one mapping between equivalent THardwareInterface objects of the two module masters.

A pair of THardwareInterface masters are considered "equivalent" if (1) they belong to the same THardwareModule master, and (2) they have THardwareInterfaceIdentifiers that are considered "==". A pair of THardwareConnection masters are considered "equivalent" if the endpoints are themselves equivalent.

Concurrency of Handles

This section describes the concurrency behaviors of handles provided by the hardware configuration framework in accordance with a preferred embodiment. The hardware configuration framework provides all clients with handles for the following: THardwareConfiguration, THardwareModule, THardwareInterface and THardwareConnection. A handle is not multi-thread safe, except as follows: A method that operates on a master in a configuration database (as opposed to a reference counted master) is atomic with respect to other operations on the same master. In implementation terms, a handle does not have an internal monitor. A reference counted master also has no internal monitor. But, for a master in the configuration database, there is synchronization to ensure that at most one operation is being applied to a master at a time.

Class Interfaces

For illustrative purposes, additional details (such as the persistence of handles and the functionality of member functions) pertaining to selected classes of the hardware configuration framework (see FIG. 2) are described below. Such additional details for classes not specifically discussed below will be apparent to persons skilled in the art based on the discussion contained herein.

THardwareConfiguration

A THardwareConfigurationHandle 204 may be saved to a file and restored at anytime. The handle will continue to be valid until the Destroy method is called. The THardwareConfiguration class 204 includes the following functions.

THardwareConfigurationHandle()
Constructs a dangling Handle. Useful as a target for streaming and assignment.
THardwareConfigurationHandle(const TText& name)
Constructs a Handle to a master THardwareConfiguration object which is constructed using the persistent hardware configuration specified by the name argument. Many different THardwareConfigurations can exist concurrently, and this name is used to uniquely identify them. The name space is managed by attaching the manufacture's name to the beginning of the name argument. If a persistent hardware configuration is not wanted, then passing in an empty name (i.e. ""), will create a non-persistent, reference-counted hardware configuration.

The persistent hardware configuration, specified by the name argument, contains all of the THardwareModule and THardwareConnection objects which requested persistence.

All handles constructed for the THardwareConfigurationHandle named "Foo", refer to the single master in the persistent hardware configuration named "Foo".
THardwareConfigurationHandle(const THardwareConfigurationHandle& copyFrom
Copies the handle, not the master. The new handle becomes a reference to the master referenced by copyFrom.
THardwareConfigurationHandle& operator=(const THardwareConfigurationHandle& copyFrom)
Copies the handle, not the master.
~THardwareConfigurationHandle()
Destroys the handle, not the master.
void Destroy()
This method destroys the persistent store and all master objects in this hardware configuration. All handles to every object in this hardware configuration become dangling, including this one.
void GetAllHardwareModules (TCollection<THardwareModuleHandle>&result) const
This method copies all of the handles which have been registered for this hardware configuration and adds them to the collection specified by the result argument. It does not empty the result first.

The copied handles reflect the state of the master THardwareConfiguration object at the time this method was called. The state of the master THardwareConfiguration object can change at any time and will not be reflected by the result directly. Changes will be reflected by the handles in the result. For example, any handle whose master has been removed from its THardwareConfiguration object becomes a dangling handle. The only methods that may be applied to a handle in the dangling state are assignment, copy or streaming operators. A dangling handle becomes authentic when it is the target of assignment or streaming where the source is not dangling.
void GetHardwareModules (TCollection<THardwareModuleHandle>& result,const HardwareModuleCategory& desiredKind) const
This method copies all of the handles of the desiredKind which have been registered for this hardware configuration and adds them to the collection specified by the result argument; caller adopts the storage. It does not empty the result first.

The copied handles reflect the state of the master THardwareConfiguration object at the time this method was called.
void AddHardwareModule(THardwareModuleHandle& newHardwareModule)
This method adds the given newHardwareModule object to this hardware configuration. It does this by moving the master THardwareModule object referred to by newHardwareModule, and any THardwareInterfaceHandle objects owned by newHardwareModule, into the hardware configuration. If the client owns handles to any THardwareInterfaceHandle objects owned by newHardwareModule, they will be updated to reflect the move into the database.
void RemoveHardwareModule(const THardwareModuleHandle& hardwareModule)

This method removes all THardwareConnection objects for each THardwareInterface object owned by the master referred to by hardwareModule. Next, the master, is removed from the hardware configuration; the master becomes reference counted by this handle. All other handles that refer to the master become dangling.

TInterest*CreateAnyChangeInterest()

This method creates an interest in any change to the hardware configuration (which includes any change to any member of the hardware configuration); client adopts result storage. Notification is sent, by this THardwareConfiguration object, to all interested clients. Clients may call this method directly to create an interest which is used to register for notification.

TStream&operator>>=(TStream& toWhere) const

Stream out a persistent reference to the master hardware configuration this handle represents.

TStream&operator<<=(TStream& fromWhere)

Stream in a reference to a master hardware configuration.

THardwareModule

A THardwareModuleHandle may be saved to a file and restored at anytime. The handle will continue to be valid until the master is removed (via a RemoveHardwareModule method). The THardwareModule class 206 includes the following functions.

THardwareModuleHandle()

Creates a reference counted master not in any hardware configuration.

THardwareModuleHandle(const THardwareModuleHandle©From)

Copies the handle, not the master. The new handle becomes a reference to the master referenced by copyFrom.

THardwareModuleHandle& operator=(const THardwareModuleHandle& copyFrom)

Copies the handle, not the master. If the left-hand side is the last reference to a master not in any hardware configuration, then the master is destroyed. The left-hand side handle then becomes a reference to the master referenced by copyFrom.

~THardwareModuleHandle()

Destroys the handle. If this is the last reference to a master not in any hardware configuration, then the master is destroyed.

void GetAllConnectors (TSequence<THardwareInterfaceHandle>&result) const

This method copies all of the handles of THardwareInterface objects owned by this THardwareModule and adds them to the collection specified by the result argument; caller adopts the storage. It does not empty the result first. The connectors are added to the result in the same order they were added to the module (i.e. the first connector added will be the first connector returned from the TSequence iterator).

The copied handles reflect the state of the master THardwareModule object at the time this method was called. The state of the master THardwareModule object can change at any time and will not be reflected by the result directly. Changes will be reflected by the handles in the result.

This method may be called directly by clients at any time. Typically, the hardware viewer framework will call this method to map the connector objects in a hardware module with the connector icons to be displayed.

void GetDefaultConnectors (TSequence<THardwareInterfaceHandle>&result) const

This method copies all of the handles of THardwareInterface objects owned by this THardwareModule which have been recorded as default connectors and adds them to the collection specified by the result argument; caller adopts the storage. It does not empty the result first. The connectors are added to the result in the same order they were added to the module.

The copied handles reflect the state of the master THardwareModule object at the time this method was called. This method may be called directly by clients at any time.

void AddConnector(const THardwareInterfaceHandle& newConnector, Boolean isDefault=FALSE)

This method moves the master THardwareInterface object referred to by newConnector into the THardwareModule master. If the isDefault argument is true, then the newConnector is recorded as a default connector.

This method is typically called when manually constructing a THardwareModule object from scratch.

void RemoveConnector(const THardwareInterfaceHandle& connector)

This method removes all connections associated with the given connector. Next, the master, specified by the connector argument, is removed from the hardware configuration; the master becomes reference counted by this handle. All other handles that refer to the master become dangling.

void GetSignature(HardwareModuleSignature& signature) const

Copies a personality neutral entity, which represents the type of device this THardwareModule object represents, into the signature argument. This personality neutral entity can be used to create a personality dependent object (e.g. a presentation object). This method may be called directly by clients at any time. Typically, the computer viewer will call this method when constructing the presentation object for this hardware module for the first time.

void SetSignature(const HardwareModuleSignature&)

Sets the type this THardwareModule object represents. This method is called when manually constructing a THardwareModule object from scratch and will rarely be called by clients directly.

void GetCategories (TCollection<HardwareModuleCategory>&result) const

This method copies all of the HardwareCategory objects owned by this THardwareModule and adds them to the collection specified by the result argument; caller adopts the storage. It does not empty the result first.

The iterator reflects the state of the master THardwareModule object at the time this method was called. This method may be called directly by clients at any time.

void AddCategory(const HardwareModuleCategory& category)

Appends the category argument to the end of the list of categories for this hardware module. This method is called when manually constructing a THardwareModule object from scratch and will rarely be called by clients directly.

void DeleteCategory(const HardwareModuleCategory& category)

Deletes the HardwareModuleCategory object, specified by the category argument, from the master THardwareModule.

Boolean IsRoot() const

Returns TRUE if this THardwareModule object is the central device of its THardwareConfiguration. Each THardwareConfiguration object has one root device. For a personal computer, the THardwareModule object which represents the computer is the root.
void SetRoot(Boolean)

Sets the "Root" attribute to the value of the given argument. This method is called when manually constructing a THardwareModule object from scratch and will rarely be called by clients directly.
Boolean IsInternal() const Returns TRUE if this THardwareModule object is located inside of the root THardwareModule. This method is called by the configuration viewer to determine if it should draw the device inside or outside of the root device. For example, the internal HD of a Macintosh is "inside" the computer.
void SetInternal(Boolean)

Sets the "Internal" attribute to the value of the given argument. This method is called when manually constructing a THardwareModule object from scratch and will rarely be called by clients directly.
Boolean WantsPersistence() const Returns TRUE if this THardwareModule object wants the hardware configuration framework to automatically restore the device when the master THardwareConfiguration object is restored. This method is typically called by the hardware configuration framework (that is, by objects of the hardware configuration framework).
void SetWantsPersistence(Boolean)

Sets the "WantsPersistence" attribute to the value of the given argument. This method is called when manually constructing a THardwareModule object from scratch and will rarely be called by clients directly.
TStream& operator>>=(TStream& toWhere) const If a master THardwareModule object is in a hardware configuration, then this method streams out a persistent reference. Otherwise, this method streams out a copy of the master, including its connectors but not their connections.
TStream& operator<<=(TStream& fromWhere)

Stream in a THardwareModuleHandle. If the object in the fromWhere argument is in a hardware configuration, then this method streams in a persistent reference. Otherwise, this method streams in a master, including its connectors.

THardwareInterface

A THardwareInterfaceHandle may be saved to a file and restored at anytime. The will remain valid until the master is removed. The THardwareInterface class 212 include following functions.
THardwareInterfaceHandle()

Creates a reference counted master not in any hardware configuration.
THardwareInterfaceHandle(const THardwareInterfaceHandle& copyFrom)

Copies the handle, not the master. The new handle becomes a reference to the master referenced by copyFrom.
THardwareInterfaceHandle& operator=(const THardwareInterfaceHandle& copyFrom)

Copies the handle, not the master. If the left-hand side is the last reference to a master not in any hardware configuration, then the master is destroyed. The left-hand side handle then becomes a reference to the master referenced by copyFrom.
~THardwareInterfaceHandle()

Destroys the handle. If this is the last reference to a master not in any hardware configuration, then the master is destroyed.
THardwareModuleHandle GetOwner() const Returns a handle to the THardwareModule object this THardwareInterface object belongs to. This method is typically called by the hardware configuration viewer.

void GetAllConnections(TCollection<THardwareConnectionHandle>& result) const

This method copies all of the THardwareConnectionHandle objects associated with this THardwareInterface and adds them to the collection specified by the result argument; caller adopts the storage. It does not empty the result first.

The copied handles reflect the state of the master THardwareInterface object at the time this method was called. This method is typically called by the hardware configuration viewer.
void DeleteConnection(const THardwareInterfaceHandle&otherEnd)

This method deletes the THardwareConnection object, specified by this object and the otherEnd, from this hardware configuration. All handles that refer to the master THardwareConnection object become dangling.
void DeleteAllConnections()

This method deletes all of the THardwareConnections from this THardwareInterface object. All handles that refer to the master THardwareConnection objects deleted become dangling. This method is typically called by the hardware configuration viewer framework.
THardwareInterfaceIdentifier* CopyHardwareInterfaceIdentifier() const Returns a pointer to the object which identifies the real physical hardware component this connector represents. Caller adopts returned storage.
void SetHardwareInterfaceIdentifier(const THardwareInterfaceIdentifier&)

Sets the "InterfaceIdentifier" attribute to the value of the given argument. This method is called when manually constructing a THardwareModule object from scratch and will rarely be called by clients directly.
short GetMaxConnections() const Returns the maximum number of connections allowed by this connector. If this value is greater than one, then the connector represents a bus (e.g. SCSI, ADB). This method is typically called by the hardware configuration viewer during connection negotiations.
void SetMaxConnections(short)

Sets the "MaxConnections" attribute to the value of the given argument. This method is called when manually constructing a THardwareModule object from scratch and will rarely be called by clients directly.
ETransmissionMode GetMode() const Returns the transmission mode supported by this connector. This method is typically called by the hardware configuration viewer during connection negotiations.
void SetMode(ETransmissionMode)

Sets the "TransmissionMode" attribute to the value of the given argument. This method is called when manually constructing a THardwareModule object from scratch and will rarely be called by clients directly.
Boolean WantsPersistentConnections() const Returns TRUE if this THardwareInterface object wants the hardware configuration framework to automatically restore its connections when the master THardwareConfiguration object is restored. A connection will be restored if either connector forming the connection makes this request.
void SetWantsPersistentConnections(Boolean)

Sets the "WantsPersistentConnections" attribute to the value of the given argument. This method is called when manually constructing a THardwareModule object from scratch and will rarely be called by clients directly.
Boolean IsReconfigurable() const Returns TRUE if the hardware represented by this THardwareInterface object can support reconfiguration. This does not mean that a service is currently available to actually perform the reconfiguration. This attribute is an optimization.

void SetWantsReconfiuration(Boolean)

Sets the "WantsReconfigruration" attribute to the value of the given argument. This method is called when manually constructing a THardwareModule object from scratch and will rarely be called by clients directly.

void GetCategories (TCollection<HardwareInterfaceCategory>& result) const

This method copies all of the HardwareCategory objects owned by this THardwareInterface and adds them to the collection specified by the result argument; caller adopts the storage. It does not empty the result first.

The iterator reflects the state of the master THardwareInterface object at the time this method was called. This method may be called directly by clients at any time.

void AddCategory(const HardwareInterfaceCategory& category)

Appends the category argument to the end of the list of categories for this hardware interface. This method is called when manually constructing a THardwareInterface object from scratch and will rarely be called by clients directly.

void DeleteCategory(const HardwareInterfaceCategory& category)

Delete the HardwareInterfaceCategory object, specified by the category argument, from the master THardwareInterface.

TStream& operator>>=(TStream& toWhere) const

If a master THardwareInterface object is in a hardware configuration, then this method streams out a persistent reference. Otherwise, this method streams out a copy of the master.

TStream& operator<<=(TStream& fromWhere)

Stream in a THardwareInterfaceHandle. If the object in the fromWhere argument is in a hardware configuration, then this method streams in a persistent reference. Otherwise, this method streams in a master.

THardwareConnectionHandle

A THardwareConnectionHandle may be saved to a file and restored at anytime. The handle will remain valid until the master is removed. The THardwareConnection class 226 includes the following functions.

THardwareConnectionHandle()

Creates a dangling handle. Useful as a target for streaming and assignment.

THardwareConnectionHandle(const THardwareInterfaceHandle& toConnector, const THardwareInterfaceHandle& fromConnector)

Creates a reference counted master not in hardware configuration.

THardwareConnectionHandle(const THardwareConnectionHandle& copyFrom)

Copies the handle, not the master. The new handle becomes a reference to the master referenced by copyFrom.

THardwareConnectionHandle& operator=(const THardwareConnectionHandle& copyFrom

Copies the handle, not the master. If the left-hand side is the last reference to a master not in any hardware configuration, then the master is destroyed. The left-hand side handle then becomes a reference to the master referenced by copyFrom.

~THardwareConnectionHandle()

Destroys the handle. If this is the last reference to a master not in any hardware configuration, then the master is destroyed.

void Add()

This method moves the master THardwareInterfaceConnection object into the hardware configuration. No connector sees this connection until Add is called.

void Remove()

This method reverses the effects of doing an Add. The master THardwareConnection object is removed from the hardware configuration; the master becomes reference counted by this handle. All OTHER handles that refer to the master become dangling. This method is typically called by the hardware configuration viewer.

THardwareInterfaceHandle GetOtherEnd(const THardwareInterfaceHandle& thisEnd) const Given the THardwareInterfaceHandle, specified by thisEnd, this method returns the THardwareInterfaceHandle at the other end.

EConnectionKind GetKind() const

Returns the kind of connection this THardwareConnection object represents. A connection may be automatic or manual. An automatic connection is made by the system. A manual connection is made by the user. It is important to be able to distinguish between these two kinds of connections. This method is typically called by the hardware configuration framework.

void SetKind(EConnectionKind)

Sets the "kind" attribute to the value of the given argument. This method is called when manually constructing a THardwareModule object from scratch and will rarely be called by clients directly.

Boolean IsPersistent() const

Returns TRUE iff either connector of this THardwareConnection object wants persistent connections. This method is typically called by the hardware configuration framework.

TStream& operator>>=(TStream& toWhere) const

If in a hardware configuration, then this method streams in a persistent reference. Otherwise, this method streams out a copy of the master.

TStream& operator<<=(TStream& fromWhere)

Stream in a THardwareConnectionHandle. If the object in the fromWhere argument is in a hardware configuration, then this method streams in a persistent reference. Otherwise, this method streams in a master.

TPartLocator

A TPartLocator object may not be saved. The TPartLocator class 218 includes the following member functions.

TPartLocator(const HardwareModuleCategory& theCompartment)

Creates a part locator capable of finding all of the hardware module prototypes (i.e. parts) specified by theCompartment. The only expected client of this constructor is TPartsBin. TPartsBin will create one of these locators for every compartment (i.e. tray, bin, tab, etc.) the parts bin will have.

Boolean FindAll (TCollection<THardwareModuleHandle>& theresult)

This method finds all the FSEntities which identify themselves as parts that want to be in this compartment. It resurrects all of the THardwareModuleHandle objects from the located files and adds them to the given collection specified by theresult; caller adopts the storage. It does not empty theresult first. It returns TRUE if it found anything. The parts bin will call this when it needs to display (or prepare to display) the contents of a particular compartment.

THardwareModuleHandle FindOne(const TText& theName)

This method returns the THardwareModuleHandle "installed" for this compartment whose HardwareModuleSignature matches theName.

TInterest* CreateAddedInterest()

This method creates an interest for clients to use to register for notification on the addition of any part which belongs to this compartment; client adopts result storage. The only expected client of this method is TPartsBin. TPartBin will call this method just before it calls FindAll, so it can ensure an up-to-date display of the available parts.

TInterest* CreateRemovedInterest()

This method creates an interest for clients to use to register for notification on the removal of any part which belongs to this compartment; client adopts result storage. The only expected client of this method is TPartsBin. TPartsBin will call this method just before it calls FindAll, so it can ensure an up-to-date display of the available parts.

TPartsBin

A TPartsBin object may not be saved. The TPartsBin class 220 includes the following member functions.

TPartsBin()

Constructs an empty parts bin.

TPartsBin(const TPartLocator& copyFrom)

Copies all of the TPartLocators owned by copyFrom into this TPartsBin.

void GetAllPartLocators(TCollection<TPartLocator>& result) const

This method copies all of the TPartLocator objects in this parts bin and adds them to the collection specified by the result argument; caller adopts the storage. It does not empty the result first.

The contents of the parts bin object can change at any time, but this will not be directly reflected by the iterator. This method may be called directly by clients at any time. The only expected client of this method is the parts bin viewer. It will display an icon (and name) for every part locator it owns. Each part locator represents a tab on the parts bin. Furthermore, when a tab is selected by the user, the parts bin viewer will display all of the parts for that compartment.

TPartLocator GetPartLocator(const HardwareModuleCategory& desiredCompartment) con Returns the TPartLocator object for the desiredCompartment in this parts bin. This method may be called directly by clients at any time.

void AddCompartmentFor(const HardwareModuleCategory& compartment)

This method creates a TPartLocator object for the kind of compartment specified by the compartment argument for this parts bin. This method may be called directly by clients at any time. The only expected client of this method is a parts bin viewer. A parts bin viewer can decide which categories it wants to display.

void RemoveCompartment(const HardwareModuleCategory& compartment)

This method removes the TPartLocator object for the kind of compartment specified by the compartment argument for this parts bin. The only expected client of this method is the parts bin viewer.

TInterest* CreateAddedInterest()

This method creates an interest for clients to use to register for notification on the addition of any new part locator. The only expected client of this method is a parts bin viewer. The parts bin viewer will call this method just before it calls GetAllPartLocators, so it can ensure an up-to-date display of the available compartments.

TInterest* CreateRemovedInterest()

This method creates an interest for clients to use to register for notification on the removal of an existing part locator. The only expected client of this method is a parts bin viewer. The parts bin viewer will call this method just before it calls GetAllPartLocators, so it can ensure an up-to-date display of the available compartments.

Automatic Configuration

Introduction

System Configuration represents a broad category of design issues including, starting/booting the system, specifying user preferences for such things as keyboard/mouse and programmatic access to configuration information. A preferred embodiment provides a polymorphic, "machine" abstraction to configure any computer, and a polymorphic "hardware" abstraction to bind a given piece of hardware to a software configuration object.

Hardware Hierarchies

IO devices can be attached to a system via many diverse hardware paths. Some are on the motherboard, some are attached to buses (ADB, NuBus, SCSI, MCA), while others are a mixture of both. For example a NuBus card with a SCSI chip on it. A simplifying abstraction is to view these different hardware configurations as a collection of hardware hierarchies.

Software Hierarchies

Viewing the hardware as a hierarchy provides a natural organization of the software for these devices into a software hierarchy. The hierarchical view of software reduces the necessary information required for communication between layers of the hierarchy. By limiting the scope of knowledge we can easily push IO policy issues to the lowest levels of the hierarchy. Note as any device generates an interrupt, the root of the software hierarchy passes control down the software hierarchy tree structure until the correct device interrupt handler is identified to process the interrupt.

Configuration Access Managers

Configuration access managers are responsible for the configuration of a collection of devices. There are two kinds of configuration access managers. The first kind has a fixed set of devices to configure and therefore has a straight forward configuration task. The second kind has an unknown number and type of devices to configure. The second kind must therefore follow a predefined procedure to identify devices that are present before it can complete its configuration task. When a configuration access manager is started up, it must identify all the devices that fall within its hierarchy. After the devices have been identified, the configuration access manager instantiates the appropriate access managers or records that the device was found but not linked with an access manager.

For example, a SCSI bus configuration access manager follows the SCSI standard protocol to identify devices that are currently attached to the SCSI bus. After a device is identified, the configuration access manager decides whether a device-specific access manager should be instantiated. An example of a fixed set of devices to configure is an expansion card with more than one device on it. In this type of configuration access manager, the policy decision would be straight forward since there is no standard protocol to follow, a particular software configuration object is instantiated based on an initial set of predefined rules associated with the expansion card. For example, the expansion card could have SCSI hardware on the expansion card. In this case the SCSI hardware would be well-known to that type of card. The devices on that SCSI hardware would have to be configured by a SCSI hardware configuration access manager. This example illustrates the recursive processing associated with configuration access manager configuration processing. The use of software hierarchy to manage an arbitrary hardware hierarchy allows the IO system to dynamically configure any hardware platform or configuration.

Parent/Child Relationship

A preferred embodiment employs a simple parent/child relationship to manage all the layers in the software hierarchies. Each interrupt handler and access manager has a parent relationship and may or may not have a child relationship. The parent/child relationship is an ideal modeling mechanism for managing a hierarchical abstraction. This parent/child relationship has two important roles to play: first, it defines how the software hierarchy is constructed, and second, what the flow of control is when an interrupt occurs. Defining where functions should be split in the hierarchy follows naturally from this modeling mechanism for most hardware. In a few cases, the job of defining the parent/child relationship is not clear. The SCC hardware is just such an example. This chip has two distinct ports (A and B) and a common interrupt register. A model could define two serial ports and allow an interrupt handler for each. If an interrupt handler for port A were to read the interrupt register, it would get the interrupt status for both ports and clear both of them by its action. This is not practical. A better solution is to define a chip and port level of abstraction. The chip abstraction is the parent in this example and it exports two software-independent serial ports. When a client (say a MIDI application) requires an assigned port, it would first locate the correct parent interrupt handler object and instantiate a MIDI Interrupt Handler.

For example, the flow of control works in the SCC hardware. For the sake of this example let's say port B generates an interrupt. The Interrupt Manager first decodes the processor interrupt anti then dispatches the SCC Interrupt Handler. The SCC interrupt handler reads and clears the interrupt register, and decodes the values that it finds. The SCC interrupt handler interprests the register and determines that port B has interrupted. It calls the interrupt manager service InvokeChild to dispatch the port B interrupt handler and passes a copy of the interrupt register to it. In this way the port B interrupt handler does not directly read the shared interrupt register.

Configuration of the System

The configuration of a system starts with an instantiation of a machine-specific object. This software object has complete knowledge of what is found in the specific baseline system. This includes what kind of IO busses, simple devices, etc. This machine specific class instantiates an object for each of the hardware components. Each of these objects has the class name of the object to continue the configuration of their bus or device. In this way the instantiation of objects along the hardware hierarchy Wads to the dynamic configuration of the IO system. The machine-specific object represents the "root" of the hardware hierarchy. It's specialized knowledge of the hardware base enables it to know exactly what hardware is resident in the system.

There is a corresponding object that represents the "root" of the software hierarchy. This object identifies the Interrupt Manager as the progenitor of the software hierarchy.

When the machine specific object instantiates an object representing a hardware component, it passes a hardware-descriptor object that defines the device's location in the system. The use of the hardware-descriptor object supports hardware location independent IO software. Because the IO software is designed to deal with hardware location independence, it is very easy to extend the software model to support multiple devices of the same type.

Figure 8:
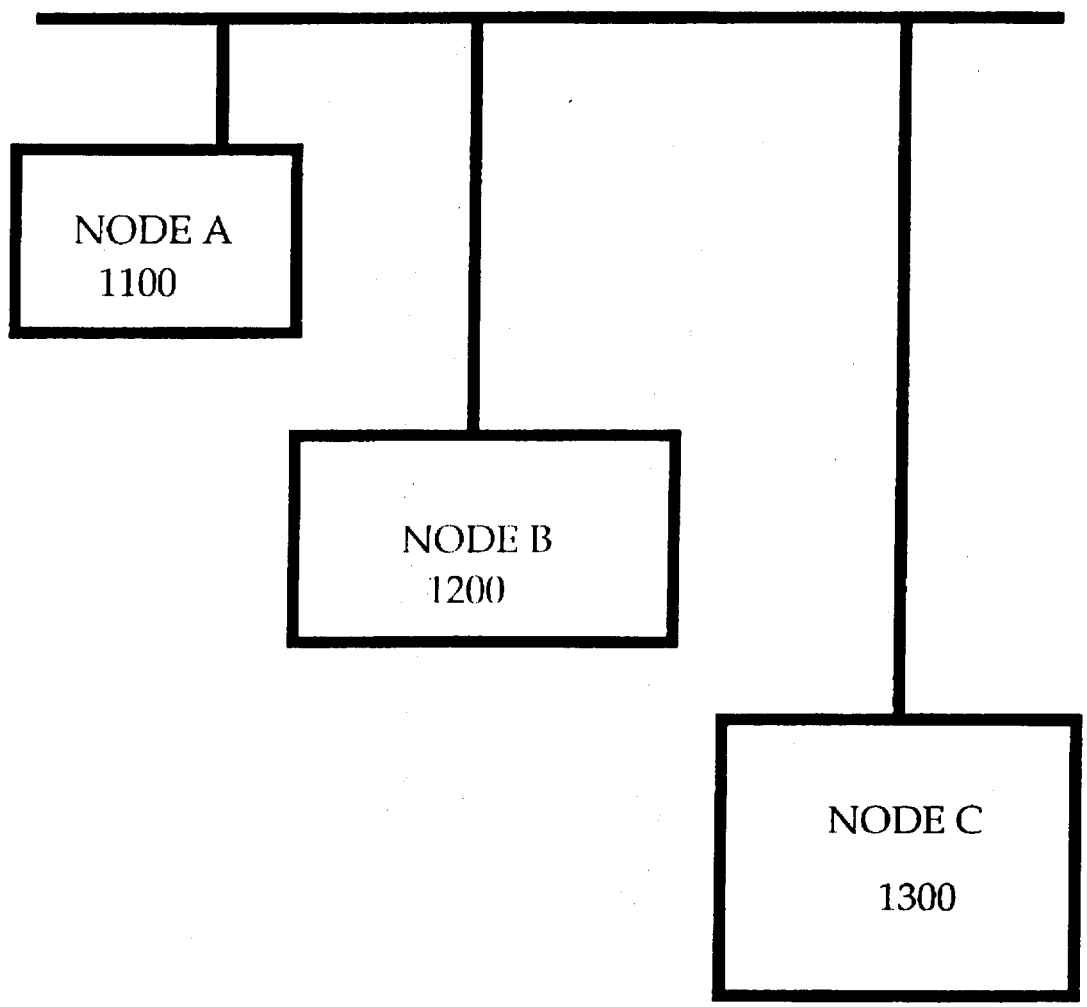
FIG. 8 is a block diagram of a network of processors in accordance with the subject invention.

FIG. 8 illustrates a three node system in accordance with a preferred embodiment. Node A 1100 functions as a configuration access manager for the network. Auto configuration of Node A proceeds as described above for a non-networked system. However, once Node A is configured, it identifies Node B 1200 as another unconfigured system and Node A 1100 loads a system specific software component into Node B 1200 by building the system as if it were a local, single node system. Then, Node C 1300 is identified as another system to auto configure over the network. Auto configuration of Node C 1300 is accomplished by Node A 1100 treating Node C 1300 as a local, single node system. Thus, the breadth and scope in accordance with a preferred embodiment should not be limited to any of the above-described exemplary embodiments, but should be defined only in accordance with the following claims and their equivalents.

Having thus described our invention, what we claim as new and desire to secure as letters patent is:

1. An apparatus for configuring a computer system in response to a configuration request, the computer system having a memory means and a plurality of hardware components connected in a hardware hierarchy having a root component, a plurality of first lower level components and at least one second lower level component, the apparatus comprising:

(a) means for storing in the memory means class information defining a plurality of machine classes, each of the plurality of machine classes corresponding to one of the plurality of hardware components;

(b) first means responsive to the configuration request and to an identification number stored in the computer system for instantiating for the root component a machine-specific object from a first one of the plurality of machine classes;

(c) means using the machine-specific object to configure the mot component and to generate an identity for each of the plurality of first lower level components;

(d) second means responsive to the identity for instantiating a hardware module object from one of the machine classes for each of the plurality of first lower level components;

(e) means using each of the hardware module objects to configure the corresponding first lower level component and to generate a hardware signature for the second lower level component; and (f) third means responsive to the hardware signature for instantiating a hardware module object from one of the machine classes for the second lower level component;

(g) means for storing in the memory class information defining a plurality of software classes, each of the plurality of software classes corresponding to one of the plurality of hardware components;

(h) means responsive to the configuration request cooperating with the first second and third instantiating means for instantiating a software object for each of the machine-specific object and hardware module objects, the software objects being arranged in a software hierarchical tree structure extending from a root software object; and (i) means in the root software object responsive to a hardware interrupt generated by one of the hardware components for passing the hardware interrupt down the hierarchical tree structure to a software object corresponding to the hardware component.

2. The apparatus as recited in claim 1, further comprising:

(j) object-oriented processing means for instantiating a software object for each hardware module object instantiated by the second and the third instantiating means.

3. The apparatus as recited in claim 2, wherein the second instantiating means further comprises means for identifying one of the plurality of first lower level components based on an identification number stored in the one first lower level component.

4. The apparatus as recited in claim 3, wherein each of the plurality of hardware components comprises means for storing an identification number in logic gates located on the each hardware component.

5. The apparatus as recited in claim 4, wherein the second instantiating means creates:

a first one of the hardware module objects to represent a monitor;

a second one of the hardware module objects to represent a printer;

a third one of the hardware module objects to represent a keyboard;

a fourth one of the hardware module objects to represent a pointing device;

a fifth one of the hardware module objects to represent a modem;

a sixth one of the hardware module objects to represent a card;

a seventh one of the hardware module objects to represent a disk drive;

an eighth one of the hardware module objects to represent a scanner; and a ninth one of the hardware module objects to represent a facsimile.

6. The apparatus as recited in claim 1, wherein the hardware hierarchy has a plurality of root components corresponding to processors and the apparatus further comprises means for configuring each of the root components.

7. The apparatus as recited in claim 1, wherein the hardware hierarchy has a plurality of root components corresponding to computer network nodes end the apparatus further comprises means for configuring each of the root components.

8. The apparatus as recited in claim 1, wherein the second lower level component has further hardware components connected thereto and the apparatus further comprises means for processing the further hardware components.

9. A method for configuring a computer system in response to a configuration request, the computer system having a memory means and a plurality of hardware components connected in a hardware hierarchy having a root component, a plurality of first lower level components and at least one second lower level component, the method comprising the steps of:

(a) storing in the memory means class information defining a plurality of machine classes, each of the plurality of machine classes corresponding to one of the plurality of hardware components;

(b) instantiating for the root component, a machine-specific object from a first one of the plurality of machine classes based on an identification number stored in the computer system;

(c) using the machine-specific object to configure the root component and to generate an identity for each of the plurality of first lower level components;

(d) instantiating a hardware module object from one of the machine classes for each of the plurality of first lower level components using the first lower level component identities;

(e) using each of the hardware module objects to configure the corresponding first lower level component and to generate a hardware signature for the second lower level component; and (f) instantiating a hardware module object from one of the machine classes for the second lower level component using the hardware signature;

(g) storing in the memory class information defining a plurality of software classes, each of the plurality of software classes corresponding to one of the plurality of hardware components;

(h) instantiating a software object for each of the machine-specific object and hardware module objects, the software objects being arranged in a software hierarchical tree structure extending from a root software object; and (i) passing a hardware interrupt down the hierarchical tree structure to a software object corresponding to the hardware component.

10. The method as recited in claim 9, further comprising the step of:

(j) instantiating a software object for each hardware module object instantiated in steps (d) and (f).

11. The method as recited in claim 9, wherein step (c) comprises the step of:

(c1) identifying one of the plurality of first lower level components based on an identification number stored in the one first lower level component.

12. The method as recited in claim 11 further comprising the step of:

(k) storing the identification number in logic gates located on the each hardware component.

13. The method as recited in claim 9, wherein the hardware hierarchy has a plurality of root component corresponding to multiple processors and the method further comprises the step of configuring each of the root components.

14. The method as recited in claim 9, wherein the hierarchy has a plurality of root components corresponding to computer network nodes and the method further comprises the step of configuring each of the root components.

15. A computer program product comprising:

a computer usable medium having a computer program thereon for automatically configuring a computer system having a plurality of hardware components connected in a hardware hierarchy having a root component, a plurality of first lower level components and at least one second lower level component, the computer program including:

(a) class information defining a plurality of machine classes, each of the plurality of machine classes corresponding to one of the plurality of hardware components and having code defining a first function for configuring the one hardware component and a second function for identifying hardware components connected to the one hardware component;

(b) first means for instantiating for the root component a machine-specific object from a first one of the plurality of machine classes from an identification number stored on the computer system;

(c) means for calling the first function in the machine-specific object to configure the root component and for calling the second function in the machine-specific object to generate an identity for each of the plurality of first lower level components;

(d) second means responsive to the identity for instantiating a hardware module object from one of the machine classes for each of the plurality of first lower level components;

(e) means for calling the first function in each of the hardware module objects to configure the corresponding first lower level component and for calling the second function in each of the hardware module objects to generate a hardware signature for the second lower level component; and (f) third means responsive to the hardware signature for instantiating a hardware module object from one of the machine classes for the second lower level component;

(g) means for storing in the memory class information defining a plurality of software classes, each of the plurality of software classes corresponding to one of the plurality of hardware components;

(h) means responsive to the configuration request and cooperating with the first second and third instantiating means for instantiating a software object for each of the machine-specific object and hardware module objects, the software objects being arranged in a software hierarchical tree structure extending from a root software object; and (i) means in the root software object responsive to a hardware interrupt generated by one of the hardware components for passing the hardware interrupt down the hierarchical tree structure to a software object corresponding to the hardware component.

16. The computer program product of claim 15 wherein the class information includes a machine class corresponding to the root component and having data defining a particular baseline computer system having a type of input bus included in the baseline computer system; data defining a type of output bus included in the baseline computer system; and data defining hardware devices included in the baseline computer system.

* * * * *